US012474898B1

(12) United States Patent
Shu et al.

(10) Patent No.: US 12,474,898 B1
(45) Date of Patent: Nov. 18, 2025

(54) INSTANCE REPLACEMENT FOR APPLICATIONS IN A SERVICE PROVIDER NETWORK

(71) Applicant: Amazon Technologies, Inc., Seattle, WA (US)

(72) Inventors: Zhan Shu, Issaquah, WA (US); Shivani Mehendarge, Redmond, WA (US); Prateek Mehrotra, Bothell, WA (US); Vedadnya Vishwas Jadhav, Seattle, WA (US); Haja Maideen Mohamed Thajudeen, North Bend, WA (US); George Anthony Torres, Portland, OR (US)

(73) Assignee: Amazon Technologies, Inc., Reno, NV (US)

( * ) Notice: Subject to any disclaimer, the term of this patent is extended or adjusted under 35 U.S.C. 154(b) by 302 days.

(21) Appl. No.: 18/230,889

(22) Filed: Aug. 7, 2023

(51) Int. Cl.
*G06F 8/36* (2018.01)
(52) U.S. Cl.
CPC ..................................... *G06F 8/36* (2013.01)
(58) Field of Classification Search
None
See application file for complete search history.

(56) References Cited

U.S. PATENT DOCUMENTS

| 10,313,424 | B2* | 6/2019 | Zhu | H04L 67/1097 |
| 2005/0262483 | A1* | 11/2005 | Laird | G06F 8/65 717/122 |
| 2022/0217043 | A1* | 7/2022 | Kumarasamy | H04L 67/34 |
| 2023/0161569 | A1* | 5/2023 | Datta | G06F 8/36 717/107 |

OTHER PUBLICATIONS

Zhou, "Cloud Service Reliability Enhancement via Virtual Machine Placement Optimization", 2017, IEEE (Year: 2017).*

* cited by examiner

*Primary Examiner* — Hossain M Morshed
(74) *Attorney, Agent, or Firm* — Hogan Lovells US LLP

(57) ABSTRACT

This disclosure describes a scheduler of an instance replacement service of a service provider network determines a first instance that needs replacement. The scheduler determines if a second instance exists and based upon determining the second instance exists, the scheduler schedules a first application to be moved from the first instance to the second instance. An executor of the instance replacement service moves the first application from the first instance to the second instance and decrements a counter by one. Based on a current value of the counter equaling zero, the executor discontinues moving of applications from the first instance to the second instance and recycles the first instance.

20 Claims, 9 Drawing Sheets

300 ⟶

```
┌─────────────────────────────────────────────────────────────────────────────┐
│ DETERMINE, BY A SCHEDULER OF AN INSTANCE REPLACEMENT SERVICE OF A SERVICE   │
│ PROVIDER NETWORK, A FIRST INSTANCE THAT NEEDS REPLACEMENT                   │
│                                    302                                      │
└─────────────────────────────────────────────────────────────────────────────┘
                                      ↓
┌─────────────────────────────────────────────────────────────────────────────┐
│          DETERMINE, BY THE SCHEDULER, IF A SECOND INSTANCE EXISTS           │
│                                    304                                      │
└─────────────────────────────────────────────────────────────────────────────┘
                                      ↓
┌─────────────────────────────────────────────────────────────────────────────┐
│ BASED AT LEAST IN PART ON DETERMINING THE SECOND INSTANCE EXISTS, SCHEDULE, │
│ BY THE SCHEDULER, A FIRST APPLICATION TO BE MOVED FROM THE FIRST INSTANCE   │
│                           TO THE SECOND INSTANCE                            │
│                                    306                                      │
└─────────────────────────────────────────────────────────────────────────────┘
                                      ↓
┌─────────────────────────────────────────────────────────────────────────────┐
│ MOVE, BY AN EXECUTOR OF THE INSTANCE REPLACEMENT SERVICE, THE FIRST         │
│ APPLICATION FROM THE FIRST INSTANCE TO THE SECOND INSTANCE                  │
│                                    308                                      │
└─────────────────────────────────────────────────────────────────────────────┘
                                      ↓
┌─────────────────────────────────────────────────────────────────────────────┐
│                  DECREMENT, BY THE EXECUTOR, A COUNTER BY ONE               │
│                                    310                                      │
└─────────────────────────────────────────────────────────────────────────────┘
                                      ↓
┌─────────────────────────────────────────────────────────────────────────────┐
│ BASED AT LEAST IN PART ON A CURRENT VALUE OF THE COUNTER EQUALING ZERO,     │
│ DISCONTINUE, BY THE EXECUTOR, MOVING OF APPLICATIONS FROM THE FIRST         │
│                      INSTANCE TO THE SECOND INSTANCE                        │
│                                    312                                      │
└─────────────────────────────────────────────────────────────────────────────┘
                                      ↓
┌─────────────────────────────────────────────────────────────────────────────┐
│                  RECYCLE, BY THE EXECUTOR, THE FIRST INSTANCE               │
│                                    310                                      │
└─────────────────────────────────────────────────────────────────────────────┘
```

FIG. 3

INSTANCE REPLACEMENT FOR APPLICATIONS IN A SERVICE PROVIDER NETWORK

BACKGROUND

Service providers offer cloud-based services via service provider networks to fulfill user's computing service needs without the users having to invest in and maintain computing infrastructure required to implement the services. These service providers are generally in the form of on-demand computing platforms that may provide network-based computing resources and functionality to implement various types of cloud-based services, such as, for example, scalable-storage services, computer-processing services, and so forth. In some examples, developers may utilize services offered by the service provider to run the systems and/or applications using virtual services (or "instances") provisioned on various configurations of hardware-based resources of a cloud-based service.

Users of service provider networks often create the applications (apps) on the instances and then execute the applications. When problems arise (e.g., the need to provide security patches to instances, due to the lack of patching capabilities), a current patching status quo is to delete apps that are located on "RED" instances, e.g., instances that are in a severe state with respect to needing security patches. As a result, a user's apps on such instances are gone, and the user has to recreate the apps on an instance. Currently, app recreation time is top usability issue for users of service provider networks. For example, in some scenarios users may not be able to recreate their apps because the desired instance type is not available. As another example, users may try multiple times to recreate their apps due to unexpected failures or high latency.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 is a flow diagram of an example method for moving apps from an image to a new image.

DETAILED DESCRIPTION

Figure 1:
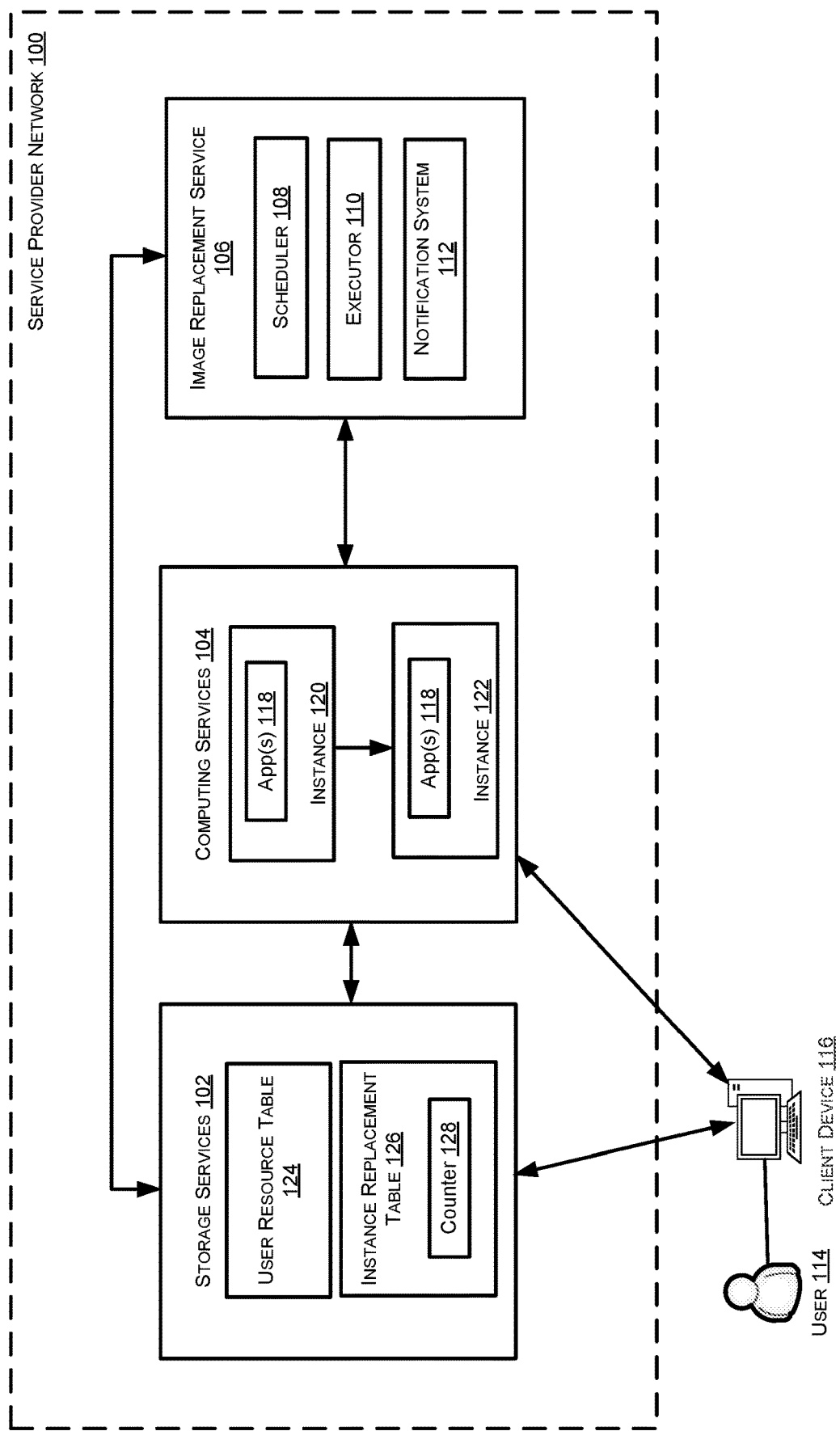
FIG. 1 schematically illustrates a system-architecture diagram of an example service provider network that includes an image replacement service.

This disclosure describes, at least in part, techniques and architecture for automated instance replacement for applications in service provider networks. Such capability provides users flexibility to migrate their apps to new instances when needed due to a current instance a user is using for apps being no longer acceptable. With such an automated instance replacement workflow in place, all app(s) may be moved from, from an unacceptable, e.g., security unpatched, instance to an acceptable, e.g., a security patched instance. As a result, users of the service provider network have no need to recreate apps during, for example, a security patching process of instances.

More particularly, in configurations, a service provider network includes multiple services that provide services to users that access the service provider network. As an example, the service provider network includes a storage service, a computing service, and an instance replacement service. Users may thus create apps on instances (e.g., virtual machines (VMs)) provided by the computing service. The users may also utilize the storage service to store, for example, data, results, etc.

In configurations, the instance replacement service may include a scheduler, an executor, and a notification system. In configurations, the scheduler identifies which instances need to be replaced and schedules the apps on the instances for remapping, e.g., moving to different instances. In configurations, the scheduler may be in the form of a multi-channel manager (MCM) that is implemented using operation (ops) scripts. In some configurations, the scheduler may be implemented to automatically identify which instances need to be replaced to address different user cases, e.g., instance replacement for patching of instances, updating specific versions of instances, etc. In configurations, the executor moves the identified apps to a different instance. As will be discussed further herein, the executor also handles errors that may occur, as well as resource management and clean-up. In configurations, the notification system provides transparent communication with users on the process and actions.

More particularly, in configurations the scheduler scans a list of instances (also referred to herein as nodes) in the computing service and for a given set of predetermined criteria, e.g., high security risk needing security patching, the scheduler selects instance identifiers (IDs) to be replaced. For each instance ID, the scheduler obtains the list of apps running on the node. The scheduler sets a field (InstanceReplaced) for the instance to false. InstanceReplaced is a field to indicate whether the instance has been replaced in a given round of instance replacement. In configurations, conditional updates to set the status may be used to avoid potential race conditions (i.e., multiple calls to update the same database record around the same time). A node is an abstraction of an instance in a user resource table. Each node record in the user resource table may only have one instance, and the node resource name is the identifier of a node. A node may have multiple apps collocated thereon.

For all of the apps that are in service on a given node, an app status may be set to PendingInstanceReplacement. In configurations, if there is an app on the node that is not in service, all the apps and the node may be skipped for instance replacement to prevent potential competition with other workflows. Status updates may be conditional updates to prevent potential race conditions where multiple workflows may update the same records in the user resource database at the same time. In configurations, a speed of setting apps into PendingInstanceReplacement may be controlled for not stressing the production and creating resource contention. More particularly, in configurations, an app may be set to PendingInstance Replacement every 30 seconds. Other time intervals may be used and the intervals may be adjusted based on actual operational load, monitors, alarms, etc. This may also help prevent race conditions when updating user data records.

In configurations, the executor may rely on a "sweeper" design and workflow to execute the instance replacement and eventually retire the instances that have been replaced by a new instance. The scheduler is responsible for setting apps to be PendingInstanceReplacement. Once the apps are set to PendingInstanceReplacement, a sweeper may trigger an app instance replacement workflow, which takes care of mapping the apps to a new instance.

In configurations, as used herein, PendingInstanceReplacement is an internal state to indicate an app is pending for instance replacement. AppInstanceReplacementWorkflow is the workflow to conduct the instance replacement. InstanceReplaced is an internal state to indicate if a node has been replaced with a new instance. InstanceReplacementNodeShutdownWorkflow is a workflow to shut down or "recycle" a node once the instance replacement is completed. InstanceReplacementTable is a database to store app/node (instance) records before replacement for use in resource management and clean-up, as well as tracking app instance replacement history. InstanceReplacementCompleted is a status to indicate if all apps on a node have been relocated to a new node (instance).

In configurations, for instance replacement, apps to be moved are set to PendingInstanceReplacement by the scheduler in the user resource table. As will be discussed further herein, when all apps on a node have been successfully replaced onto a new node, in configurations the InstanceReplaced may be reset to false. The scheduler provides an additional step to make sure the field is correctly set. The sweeper may pick up the apps in PendingInstanceReplacement and begin the AppInstanceReplacementWorkflow.

For acquiring a new node, the app/node records may be copied from the user resource table to the instance replacement table for tracking the apps' state before InstanceReplacement. There may be an existing node available for an instance replacement request that is determined by a node/app key schema design. For example, if the existing node is in service and InstanceReplaced is false (i.e., the node's instance has not been replaced yet), the node may be set to PendingInstanceReplacement. This status may be updated through a database conditional write (conditional on the entire record) to avoid potential race conditions where multiple calls to update the same node record in the instance replacement table. If the conditional writes fail, a retry may be executed by refetching the records from the instance replacement table as the new condition. In configurations, a maximum number of retries may be four, as the maximum number of app collocation on the same node is four in configurations. In configurations, there may be more or fewer retries and/or app collocation on a node. A NodeStartupWorkflow may be started to obtain a new instance. In configurations, an app may be placed on the existing node directly, without modifying the node status. The AppInstanceReplacementWorkflow may wait for the PendingInstanceReplacement node to be in service and move on to next steps once the node is in service. At a complete app workflow phase of the AppInstanceReplacementWorkflow, the number of apps on the node being processed may be updated. If all apps on the node have been handled, the node may be set to InstanceReplacementCompleted, and the sweeper may kick off a workflow to shut down resources before instance replacement.

As previously noted, in configurations, multiple apps may be collocated on the same node. Each app on a node may be instance replaced through the app's AppInstanceReplacementWorkflow. In configurations, apps on the same node may be replaced to the same new node. Even though there may be multiple apps on a node, in configurations, only one NodeStartupWorkflow may be started to provide a new instance for this particular node. For example, only when the node is in service and the InstanceReplaced is false (this implies that this is the first app on this particular node that starts the node's instance replacement). The node may be set to pending InstanceReplacement and as a result, will start the NodeStartupWorkflow to bring up a new instance. Otherwise, the NodeStartupWorkflow may use the existing node directly.

Since the node is in service and InstanceReplaced is false, this implies that the node has not started instance replacement yet. When multiple apps acquire a new node for their instance replacement workflow at the same time, one app may win to update the node status to PendingInstanceReplacement at first and start the NodeStartupWorkflow. The other apps will fail to update the node status because the node updates are conditional on the entire node record that was fetched from user resource table when called to acquire a new node. If one app succeeds on updating the node status to PendingInstanceReplacement from InService, the node record on which the other apps are conditional has changed and as a result, the node updates to the user resource table will fail. A retry may be executed where the latest node record from user resource table may be refetched. At this time, the node status is now PendingInstanceReplacement and will return the existing node directly to AppInstanceReplacement workflow and waiting for the node from PendingInstanceReplacement to be in service and move on to next steps of the workflow.

In configurations, if a user creates a new app during the instance replacement workflow, when there is no node available for the new app, a new node may be created directly. In configurations, this has no interaction with the instance replacement workflow. When there is a node available for the app due to the collocation logic, the node may be updated with the new app information. If the node happens to be in PendingInstanceReplacement status, the app workflow may wait for the node transit from PendingInstanceReplacement to in service. As a result, the new app may be placed on the new node with the latest machine image. In configurations, is a user attempts to delete an app during instance replacement, since the app is set to PendingInstanceReplacement internally (which is seen as pending externally), as a result, the user is blocked from deleting the app.

When an app is operating, an AppRunWorkflow monitors the app. In configurations, when the app is set to PendingInstanceReplacement, the AppRunWorkflow stops monitoring the app. Once the app is in service after the instance replacement, the AppRunWorkflow may monitor the app again.

In general, multiple workflows updating the same record around the same time may create race conditions. In order to address this, in configurations, conditional updates may be implemented by conditioning on the entire record. If there were any race conditions from other workflows where records were updated before the current workflow updated it, the updates/writes that were conditional on the out-of-date records would be failed. In configurations, a retry may be implemented when conditional updates failed. During retry, the records may be refetched from the user resource table and modification may be applied on the just-fetched records. A conditional update may then be performed again. In configurations, apps may be sequentially set to PendingInstanceReplacement with a predetermined interval so that the apps may be processed in a sequential order to avoid the race condition at the workflow level. This may prevent the multiple AppInstanceReplacementWorkflows to modify the same node record around the same time, thereby preventing race conditions.

In configurations, in a successful instance replacement scenario, apps on the node to be replaced may have transitions from InService to PendingInstanceReplacement (internal state) to InService. Users may have an experience the apps are remapped to a new instance of same type as it was before. Additionally, the same placement strategy may be used as before so that users do not end up with more or less nodes as compared to before instance replacement. This is important so that users are not charged any unnecessary fees by an operator of the service provider network.

An in-memory state or execution context may be lost for the apps after instance replacement. Thus, the users may have to re-run their workloads on their apps on the new node from the beginning. This is disruptive to the users. Accordingly, in configurations user access to their apps during instance replacement is blocked. In configurations, users may be allowed to use an app if the app only requires Internet protocol (IP) to communicate.

In configurations, users may be informed that their apps have been replaced with a new instance. In configurations, health dashboard notification may be used. In configurations, in-app notifications may be used.

An instance replacement consists of multiple app instance replacement. It is desirable to track how many app instance replacements have been completed. Based on instance replacements that have been completed, it can be determined if the instance replacement is successful or not.

In configurations, there are two records used to track the instance replacement progress (i.e., app instance replacement progress). PreviousState refers to the app/node status before instance replacement, and CurrentState means the latest state when and after instance replacement starts. Additionally, PreviousStateNode is a user resource table record that stores the node information before instance replacement. This record is used for tracking instance replacement history and as a reference for tracking instance replacement progress. This may also be used as a target state in rollback. CurrentStateNode is a user resource table record that stores the latest node information when and after instance replacement occurs. PreviousStateApp is a user resource table record that stores the app information before instance replacement. This record may be used for tracking app history and the target state in rollback. CurrentStateApp is a user resource table record that stores the latest app information when and after instance replacement starts.

It is desirable to keep track of the previous state records, so that resources may be released held at the end of the InstanceReplacement. The PreviousState records provide some useful metrics, e.g., how many rounds of instance replacement will a single app have? Also, the PreviousState records may also be helpful for debugging when errors happen.

In configurations, in order to store the previous state, the existing record in the user resource table may be modified and the previous state may be placed into a new field called PreviousState before instance replacement starts for both the node and the app. This will happen at a GetMetadata stage for each workflow. In this case, each app/node will have one single record, the field PreviousState may be used as PreviousStateRecord, and the rest of the fields may be used as the CurrentStateRecord. In other configurations, a new record may be created in the user resource table to duplicate the existing app/node records. This new record may have the same partition key, but the sub resource Identifier may be modified with a postfix: PreviousState. In this configuration, there are two records: the duplicated one with postfix PreviousState that serves as the PreviousStateRecord and the one without the postfix serves as the CurrentStateRecord. In yet other configurations, a new database table called InstanceReplacementStateTable may be created to store the PrevisousStateRecords. The records in this table may have exactly the same schema design as the user resource table. In this case, all the records in the user resource table may be used as the CurrentStateRecord and the records in the new table as the PreviousStateRecord.

In configurations, each app with the same key may have one record in the table with the latest metadata. A field NumberOfAppThroughInstanceReplacement may be used to track how many times the app has been through instance replacement. If an app has been through instance replacement for multiple times, the app record may contain the metadata from the latest app and the field NumberOfAppThroughInstanceReplacement may show how many times it has been instance replaced. This arrangement may be used to collect data and evaluate if there is a need to keep track every record from each round of InstanceReplacement.

In configurations, each node record may be copied from the user resource table to the instance replacement table when instance replacement starts. Node records may be set to InstanceReplacementCompleted when all apps on the node have been through instance replacement. The InstanceReplacementNodeShutDownWorkflow may be started to clean the resources in the node records and the node records may be deleted from the instance replacement table. Additionally, the executor may "recycle" or shut down the original instance.

In a successful case, the node record may be deleted from the instance replacement table and its held resources may be released. However, the node record from last round may not be deleted successfully due to failures. To address this, the node with the same resource name may be checked to see if it has already existed or not when duplicating the node record into the InstanceReplacementStateTable. If not, the record may be copied directly into InstanceReplacementStateTable. If it has existed, the node record may be checked to see if the record in the instance replacement state table is the same as the one in the user resource table. If yes, skip copying the record. If no, set the node in the instance replacement state table to InstanceReplacementCompleted to clean up the resources and delete the node record. Also, copy the current node record from the user resource table to the instance replacement state table.

As previously, noted, certain types of apps may be collocated on a single node. As a result, a completed instance replacement implies that all apps on the node have been replaced to the new node. Keeping track of the number of apps that are replaced onto the new node tracks the progress of the instance replacement. An instance replacement is completed when all apps on a node are replaced. In configurations, the progress through the PreviousStateNode may be tracked. In configurations, a field called NumberOfAppPendingInstanceReplacement may be used. Every time when the AppInstanceReplacement workflow succeeds, the PreviousStateRecord may be queried and reduced by 1 at the CompleteAppWorkflowPhase. Note, even if the apps are not successfully instance replaced, e.g., a failure occurs, this number may be reduced by 1. When the number of a counter reaches zero, the node record in the InstanceReplacementTable is set InstanceReplacementCompleted, which triggers an InstanceReplacementNodeShutdownWorkflow to clean up and manage the instance resources. Additionally, the executor "recycles" or shuts down the original instance. The node record in the user resource table will set InstanceReplaced to False for the new instance. As a result, the new instance is ready for a next-round of instance replacement in the future. With such a configuration, there is no need to maintain an additional record in the user resource table and the PreviousState records in InstanceReplacementStateTable share the same key schema as those in user resource table. Thus, the existing query and modification logic may be shared across two tables.

In configurations, tracking the number of apps that are replaced onto the new node may include creating a new record solely for tracking progress. This record may have the same partition key as the node record, but a sub-resource identifier may be called InstancePlacementProgressTracking. This record may contain two fields: NumberOfActiveApps and the sub-resource identifier of the node.

As previously noted, sometimes there is a failure when attempting to move apps to new instances. In configurations, the successfully instance replaced apps may be kept and the failed apps may be set to Failed. A notification may be sent to a user of the failed app(s) that certain apps failed during instance replacement. At the CompleteWorkFlow stage, apps that failed during instance replacement may have a status of Failed and apps that are successfully moved may have a status of InService. The node record in the user resource table may be handled by as follows. If a node failed to get a new instance in NodeStartUpWorkflow, the node status may be set to Failed and the newly created instance and resource may be terminated. If no apps are successfully running on the node after instance replacement, the node record may be deleted.

In configurations, when one or more app(s) fail to move instances properly, all apps as well as the node may be rolled back to a previous state. At the CompleteWorkFlowStage, PreviousState records may be swapped with CurrentState records. The previous state records may be stored in a different InstanceReplacementStateTable and the current state records may be queried and inserted into the InstanceReplacementStateTable with a modified sub-resource identifier, which may then be delete from the user resource table. The previous state records may be queried from InstanceReplacementStateTable and inserted into the user resource table, which may then be deleted from the InstanceReplacementStateTable.

In configurations, when one or more app(s) fail to move instances properly, all apps as well as the node may be terminated and a notification may be sent to the user that their apps are terminated. At CompleteWorkFlow stage, PreviousStateAppRecords and PreviousStateNodeRecords may be set to Deleting and the AppRecords (both in-service and failed apps) and node records in the user resource table may be set to deleting.

By rollbacking to the old state, the users may be able to continue to use the app(s) without impact, but in the patching scenario, the apps may continue to run on unpatched instances. The approach of terminating instances/apps directly may be the opposite, that is, the unpatched instances may be removed, but the user will have to re-create the apps on an instance.

In configurations, some users pass along a self-managed KMS KeyId (also referred to as CMK) for encryption and decryption for EFS and EBS volume. A grant may be created in a ResourceManagerService (RM) with users' FAS credential, when an instance is started in the RM. The FAS is short-lived, but the permission associated with the grant may persist until being expired. As a result, the computing service may be able to use the CMK even without the users' credentials (e.g., FAS). The grant may retired when the instance is terminated. In the instance replacement, there is no FAS credential from users, and thus a new Grant token may not be created when the instance is started for the instance replacement. Accordingly, in configurations, the RM may be used to manage the grant's life cycle. This does not change the logic how the grant token is created but does impact how the grant token is retired. In configurations, a new tag may be added to the instances (e.g., instance replacement) at the end of the NodeStartUpWorkflow. In RM, the tags of the instances may be evaluated and the grant token may not be retired when the instances are tagged with instance replacement. In configurations, a new parameter may be passed to indicate that the instances are instance replacement instances in the InstanceReplacementNodeShutdownWorkflow when calling RM. On the RM side, logic may be updated to not retiring the grant token based on the passed along parameters In configurations, the grant token may be transferred from an old resource group (i.e., the resource group before instance replacement) to a new one (i.e., the new resource group created during instance replacement). As a result, the grant may be identified and retried through the token when the new resource group is deleted due to app deletion. On the workflow side, the grant token may be obtained from the old resource group's description, inserted into the new resource group description, and an update request may be sent to the RM at the step of AttachEncryptedEBSVoume of the NodeStartupWorkflow. The grant token may be preserved when deleting the old resource group upon InstanceReplacementCompleted. The purpose of this step is to keep the grant active so that the new resource group may continue to use the grant.

In configurations, in the NodeStartupWorkflow when creating a new app, a new grant may be created, which is stored in the node records. In the InstanceReplacementNodeShutdownWorkflow, the grant may be retired. If the node is shut down due to the instance replacement, retiring the grant may be skipped. The grant creation and retirement logic in the RM may be removed.

As an example, in configurations, a method may include determining, by a scheduler of an instance replacement service of a service provider network, a first instance that needs replacement. The method may also include determining, by the scheduler, if a second instance exists. The method may further include based upon determining the second instance exists, scheduling, by the scheduler, a first application to be moved from the first instance to the second instance. The method may also include moving, by an executor of the instance replacement service, the first application from the first instance to the second instance. The method may further include decrementing, by the executor, a counter by one. The method may also include based on a current value of the counter equaling zero, discontinuing, by the executor, moving of applications from the first instance to the second instance.

In configurations, the method may include based upon determining non-existence of the second instance, creating, by the executor, the second instance.

In configurations, the method may further include determining, by the scheduler, multiple applications that need to be moved from the first instance to the second instance, wherein the multiple applications comprise the first application. The method may also include scheduling, by the scheduler, the multiple applications to be moved from the first instance to the second instance and setting, by the executor, the counter to a value equal to a number of the multiple applications to be moved from the first instance to the second instance. In such configurations, the method may further include receiving, by a service of the service provider network from a user, an indication of deletion of a second application of the multiple applications and pausing, by the service, deletion of the second application until the second application has been moved from the first instance to the second instance.

In configurations, the method may include obtaining, by the executor, metadata relating to a state of the first application from a user resource table and storing, by the executor, the meta data in an instance replacement table. The method may further include subsequent to moving the first application, auditing, by the executor, the metadata, wherein the auditing comprises determining how many times the first application has been moved among instances, debugging errors, and releasing resources of the service provider network after moving the first application from the first instance to the second instance, wherein the resources are related to the state of the first application.

In configurations, the method may include determining, by the executor, one or more configurations of the first application are incompatible with the second instance and providing, by the executor, a notification to a user of the first application that one or more configurations of the first application are incompatible with the second instance. The method may also include receiving, by a service of the service provider network from the user, an indication of deletion of the first application from the second instance, and receiving, by the service from the user, an indication of recreation of the first application as a recreated first application. The method may also include placing, by the service, the recreated first application on the second instance.

In configurations, the method may include determining, by the executor, the moving of the first application from the first instance to the second instance has failed and deleting, by the executor, metadata related to the first application from an instance replacement table. The method may also include providing, by the executor, a notification to a user of the first application that the moving of the first application from the first instance to the second instance has failed and receiving, by a service of the service provider network from the user, an indication of recreation of the first application as a recreated first application. The method may also include placing, by the service, the recreated first application on the second instance. In such configurations, the method may further include based on the moving of the first application from the first instance to the second instance, decrementing, by the executor, a counter by one.

In configurations, the method may include receiving, by a service of the service provider network from a user, an indication of creation of a second application and determining, by the service of the service provider network the moving of applications from the first instance to the second instance is in progress. The method may further include waiting, by the service, for discontinuing of the moving of applications from the first instance to the second instance and after discontinuing of the moving of applications from the first instance to the second instance, placing, by the service, the second application on the second instance.

Thus, the techniques and architecture described herein provide for replacing images in a computing service of a service provider network and moving apps from an instance to a new instance. The apps can be moved automatically with minimal effect on user experience. Additionally, by moving apps automatically before an instance is compromised due to security issues, computing and storage resources of the service provider network are not used as long, freeing up computing resources for processing of other data and/or other projects and/or services within the service provider network. Additionally, by moving apps automatically before an instance is compromised due to security issues stealing of resources, confidential information, etc., may be prevented.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates a system-architecture diagram of an example service provider network 100. The service provider network 100 may comprise servers (not illustrated) that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network 100 may be distributed across one or more physical or virtual devices.

As may be seen in FIG. 1, the service provider network 100 includes storage services 102 and computing services 104 that are provided by the service provider network 100. As is known, in configurations, other types of services may also be provided by the service provider network 100. The storage services 102 and computing services 104, as well as any other services, may be provided to businesses or individuals.

In configurations, the service provider network 100 includes instance replacement service 106. The instance replacement service includes a scheduler 108, an executor 110, and a notification system 112.

In configurations, a user 114 accesses the service provider network 100 using a client device 116. The user 114 may thus obtain computing services 102 and storage services 104, as well as other services, from the service provider network 100, using the client device 116. As an example, the user 114 may utilize the user device 116 to obtain computing resources from the computing service 104. The user 114 may define one or more apps 118 on an instance 120. In configurations, the instance 120 may need to be replaced. Thus, as will be described further herein, the scheduler 108 may schedule the apps 118 for movement to a new instance 122. The executor 110 may then, as will be described further herein, move the apps 118 to the second instance 122.

In configurations, the scheduler 108 identifies that instance 120 needs to be replaced and schedules the apps 118 on the instance 120 for remapping, e.g., moving to instance 122. In configurations, the scheduler 108 may be in the form of a multi-channel manager (MCM) that is implemented using operation (ops) scripts. In some configurations, the scheduler 108 may be implemented to automatically identify which instances need to be replaced to address different user cases, e.g., instance replacement for patching of instances, updating specific versions of instances, etc. In configurations, the executor 110 moves the identified apps 118 to a different instance, e.g., instance 122. As will be discussed further herein, the executor 110 also handles errors that may occur, as well as resource management and clean-up. In configurations, the notification system 112 provides transparent communication with the user 114 on the process and actions.

More particularly, in configurations the scheduler 108 scans a list of instances (also referred to herein as nodes) in the computing service 104 and for a given set of predetermined criteria, e.g., high security risk needing security patching, the scheduler 108 selects instance identifiers (IDs) to be replaced. For each instance ID, the scheduler 108 obtains the list of apps, e.g., apps 118, running on the node, e.g., instance 120. The scheduler 108 sets a field (InstanceReplaced) for the instance 120 to false. InstanceReplaced is a field to indicate whether the instance 120 has been replaced in a given round of instance replacement. In configurations, conditional updates to set the status may be used to avoid potential race conditions (i.e., multiple calls to update the same database record around the same time). A node is an abstraction of an instance in a user resource table 124. Each node record in the user resource table 124 may only have one instance, and the node resource name is the identifier of a node. A node may have multiple apps collocated thereon.

For apps 118 that are in service on instance 120, an app status may be set to PendingInstanceReplacement. In configurations, if there is an app on the instance 120 that is not in service, all the apps 118 and the instance 120 may be skipped for instance replacement to prevent potential competition with other workflows. Status updates may be conditional updates to prevent potential race conditions where multiple workflows may update the same records in the user resource table 124 at the same time. In configurations, a speed of setting apps into PendingInstanceReplacement may be controlled for not stressing the production and creating resource contention. More particularly, in configurations, an app may be set to PendingInstance Replacement every 30 seconds. Other time intervals may be used and the intervals may be adjusted based on actual operational load, monitors, alarms, etc. This may also help prevent race conditions when updating user data records.

In configurations, the executor 110 may rely on a "sweeper" design and workflow to execute the instance replacement and eventually retire the instances, e.g., instance 120 that have been replaced by a new instance, e.g., instance 122. The scheduler 108 is responsible for setting apps 118 to be PendingInstanceReplacement. Once the apps 118 are set to PendingInstanceReplacement, the executor 110 may trigger an app instance replacement workflow, which takes care of mapping the apps 118 to the new instance 122.

In configurations, as used herein, PendingInstanceReplacement is an internal state to indicate an app is pending for instance replacement. AppInstanceReplacementWorkflow is the workflow to conduct the instance replacement. InstanceReplaced is an internal state to indicate if a node has been replaced with a new instance. InstanceReplacementNodeShutdownWorkflow is a workflow to shutdown a node once the instance replacement is completed. An InstanceReplacementTable 126 is a database to store app/node (instance) records before replacement for use in resource management and clean-up, as well as tracking app instance replacement history. InstanceReplacementCompleted is a status to indicate if all apps on a node have been relocated to a new node (instance).

In configurations, for instance replacement, apps 118 to be moved are set to PendingInstanceReplacement by the scheduler 108 in the user resource table 124. As will be discussed further herein, when all apps 118 on the instance 120 have been successfully replaced onto the new instance 122, in configurations the InstanceReplaced may be reset to false. The scheduler 108 may provide an additional step to make sure the field is correctly set. The executor 110 may pick up the apps 118 in PendingInstanceReplacement and begin the AppInstanceReplacementWorkflow.

For acquiring a new instance, the app/node records may be copied from the user resource table 124 to the instance replacement table 126 for tracking the apps' state before InstanceReplacement. There may be an existing instance, e.g., instance 122, available for an instance replacement request that is determined by a node/app key schema design. For example, if the existing instance 122 is in service and InstanceReplaced is false (i.e., the node's instance has not been replaced yet), the instance 122 may be set to PendingInstanceReplacement. This status may be updated through a database conditional write (conditional on the entire record) to avoid potential race conditions where multiple calls to update the same node record in the instance replacement table 126. If the conditional writes fail, a retry may be executed by refetching the records from the instance replacement table 126 as the new condition. In configurations, a maximum number of retries may be four, as the maximum number of app collocation on the same instance is four in configurations. In configurations, there may be more or fewer retries and/or app collocation on an instance. A NodeStartupWorkflow may be started to obtain a new instance, e.g., instance 122. In configurations, an app 118 may be placed on the existing instance directly, without modifying the node status. The AppInstanceReplacementWorkflow may wait for the PendingInstanceReplacement node to be in service and move on to next steps once the node is in service. At a complete app workflow phase of the AppInstanceReplacementWorkflow, the number of apps on the instance 120 being processed may be updated. If all apps 118 on the instance 120 have been handled, e.g., all apps 118 have been moved to instance 122, the instance 122 may be set to InstanceReplacementCompleted, and the executor 110 may begin a workflow to shut down resources before instance replacement.

As previously noted, in configurations, multiple apps may be collocated on the same instance. Each app on an instance may be instance replaced through the app's AppInstanceReplacementWorkflow. In configurations, apps on the same instance may be replaced to the same new instance, all apps 118 may be moved from instance 120 to instance 122. Even though there may be multiple apps on an instance, in configurations, only one NodeStartupWorkflow may be started to provide a new instance for this particular instance.

For example, only when the instance 120 is in service and the InstanceReplaced is false (this implies that this is the first app on this particular instance 120 that starts the instance's instance replacement). The instance 120 may be set to pending InstanceReplacement and as a result, will start the NodeStartupWorkflow to bring up a new instance, e.g., instance 122. Otherwise, the NodeStartupWorkflow may use the existing instance 120 directly.

Since the instance 120 is in service and InstanceReplaced is false, this implies that the instance 120 has not started instance replacement yet. When multiple apps acquire a new instance for their instance replacement workflow at the same time, one app may win to update the instance status to PendingInstanceReplacement at first and start the NodeStartupWorkflow. The other apps will fail to update the instance status because the instance updates are conditional on the entire node record that was fetched from the user resource table 124 when called to acquire a new instance. If one app succeeds on updating the instance status to PendingInstanceReplacement from InService, the node record on which the other apps are conditional has changed and as a result, the instance updates to the user resource table 124 will fail. A retry may be executed where the latest node record from the user resource table 124 may be refetched. At this time, the node status is now PendingInstanceReplacement and will return the existing instance 120 directly to AppInstanceReplacement workflow.

In configurations, if the user 114 creates a new app during the instance replacement workflow, when there is no node available for the new app, a new node may be created directly. In configurations, this has no interaction with the instance replacement workflow. When there is a node available for the app due to the collocation logic, the node may be updated with the new app information. If the node happens to be in PendingInstanceReplacement status, the app workflow may wait for the node transit from PendingInstanceReplacement to in service. As a result, the new app may be placed on the new node with the latest machine image. In configurations, is a user attempts to delete an app during instance replacement, since the app is set to PendingInstanceReplacement internally (which is seen as pending externally), as a result, the user 114 is blocked from deleting the app.

When an app, e.g., one of apps 118, is operating, an AppRunWorkflow monitors the app. In configurations, when the app is set to PendingInstanceReplacement, the AppRunWorkflow stops monitoring the app. Once the app is in service after the instance replacement, the AppRunWorkflow may monitor the app again.

In configurations, in a successful instance replacement scenario, apps 118 on the instance 120 to be replaced may have transitions from InService to PendingInstanceReplacement (internal state) to InService. The user 114 may have an experience where the apps 118 are remapped to a new instance, e.g., instance 122, of the same type as instance 120 was before. Additionally, the same placement strategy may be used as before so that the user 114 does not end up with more or less instances as compared to before instance replacement. This is important so that the user 114 is not charged any unnecessary fees by an operator of the service provider network 100.

An in-memory state or execution context may be lost for the apps after instance replacement. Thus, the user 114 may have to re-run their workloads on their apps on the new instance 122 from the beginning. This is disruptive to the user 114. Accordingly, in configurations user access to the apps 118 during instance replacement is blocked. In configurations, the user 114 may be allowed to use an app if the app only requires Internet protocol (IP) to communicate.

In configurations, the user 114 may be informed that their apps 118 have been replaced with a new instance, e.g., instance 122. In configurations, a health dashboard notification may be used by the notification system 112. In configurations, in-app notifications may be used.

Aa previously noted, an instance replacement consists of multiple app instance replacement. It is desirable to track how many app instance replacements have been completed. Based on instance replacements that have been completed, it can be determined if the instance replacement is successful or not.

In configurations, there are two records used to track the instance replacement progress (i.e., app instance replacement progress). PreviousState refers to the app/node status before instance replacement, and CurrentState means the latest state when and after instance replacement starts. Additionally, PreviousStateNode is a user resource database record that stores the node information before instance replacement. This record is used for tracking instance replacement history and as a reference for tracking instance replacement progress. This may also be used as a target state in rollback. CurrentStateNode is a user resource database record that stores the latest node information when and after instance replacement occurs. PreviousStateApp is a user resource database record that stores the app information before instance replacement. This record may be used for tracking app history and the target state in rollback. CurrentStateApp is a user resource database record that stores the latest app information when and after instance replacement starts.

It is desirable to keep track of the previous state records, so that resources may be released held at the end of the InstanceReplacement. The PreviousState records provide some useful metrics, e.g., how many rounds of instance replacement will a single app have? Also, the PreviousState records may also be helpful for debugging when errors happen.

In configurations, in order to store the previous state, the existing record in the user resource table 124 may be modified and the previous state may be placed into a new field called PreviousState before instance replacement starts for both the instance 120 and the apps 118. This will happen at a GetMetadata stage for each workflow. In this case, each app/node will have one single record, the field PreviousState may be used as PreviousStateRecord, and the rest of the fields may be used as the CurrentStateRecord. In other configurations, a new record may be created in the user resource table 124 to duplicate the existing app/node records. This new record may have the same partition key, but the sub resource Identifier may be modified with a postfix: PreviousState. In this configuration, there are two records: the duplicated one with postfix PreviousState that serves as the PreviousStateRecord and the one without the postfix serves as the CurrentStateRecord. In yet other configurations, a new database table called instance replacement state table may be created to store the PrevisousStateRecords. In configurations, the instance replacement state table may be part of the instance replacement table 126. The records in this table may have exactly the same schema design as the user resource table 124. In this case, all the records in the user resource table 124 may be used as the CurrentStateRecord and the records in the new table, e.g., instance replacement state table, as the PreviousStateRecord.

In configurations, each app with the same key may have one record in the table with the latest metadata. A field NumberOfAppThroughInstanceReplacement may be used to track how many times the app has been through instance replacement. If an app has been through instance replacement for multiple times, the app record may contain the metadata from the latest app and the field NumberOfAppThroughInstanceReplacement may show how many times it has been instance replaced. This arrangement may be used to collect data and evaluate if there is a need to keep track every record from each round of InstanceReplacement.

In configurations, each node record may be copied from the user resource table 124 to the instance replacement table 126 when instance replacement starts. Node records may be set to InstanceReplacementCompleted when all apps on the node have been through instance replacement. The InstanceReplacementNodeShutDownWorkflow may be started to clean the resources in the node records and the node records may be deleted from the instance replacement table 126. Additionally, the executor 110 "recycles" or shuts down the instance 120.

In a successful case, the node record may be deleted from the instance replacement table 126 and its held resources may be released. However, the node record from the last round may not be deleted successfully due to failures. To address this, the node with the same resource name may be checked to see if it has already existed or not when duplicating the node record into the instance replacement state table. If not, the record may be copied directly into instance replacement state table. If it has existed, the node record may be checked to see if the record in the instance replacement state table is the same as the one in the user resource table 124. If yes, skip copying the record. If no, set the node in the instance replacement state table to InstanceReplacementCompleted to clean up the resources and delete the node record. Also, copy the current node record from the user resource table 124 to the instance replacement table 126.

As previously, noted, certain types of apps may be collocated on a single node. As a result, a completed instance replacement implies that all apps on the node have been replaced to the new node. Keeping track of the number of apps that are replaced onto the new node tracks the progress of the instance replacement. An instance replacement is completed when all apps on a node are replaced. In configurations, the progress through the PreviousStateNode may be tracked. In configurations, a field called NumberOfAppPendingInstanceReplacement may be used. Every time when the AppInstanceReplacement workflow succeeds, the PreviousStateRecord may be queried and reduced by 1 at the CompleteAppWorkflowPhase. In configurations, even if the apps are not successfully instance replaced, e.g., a failure occurs, this number may be reduced by 1. When the number of a counter 128 reaches zero, the node record in the instance replacement table 126 set InstanceReplacementCompleted, which triggers an InstanceReplacementNodeShutdownWorkflow to clean up and manage the instance resources. Additionally, the executor 110 "recycles" or shuts down the instance 120. The node record in the user resource table 124 will set InstanceReplaced to False for instance 122. As a result, the instance 122 is ready for a next-round of instance replacement in the future. With such a configuration, there is no need to maintain an additional record in the user resource table 124 and the PreviousState records in instance replacement state table share the same key schema as those in user resource table 124. Thus, the existing query and modification logic may be shared across the two tables.

In configurations, tracking the number of apps that are replaced onto the new node may include creating a new record solely for tracking progress. This record may have the same partition key as the node record, but a sub-resource identifier may be called InstancePlacementProgressTracking. This record may contain two fields: NumberOfActiveApps and the sub-resource identifier of the node.

As previously noted, sometimes there is a failure when attempting to move apps to new instances. In configurations, the successfully instance replaced apps may be kept and the failed apps may be set to Failed. A notification may be sent by the notification system 112 to the user 114 of any failed app(s) 118 that certain apps failed during instance replacement. At the CompleteWorkFlow stage, apps that failed during instance replacement may have a status of Failed and apps that are successfully moved may have a status of InService. The node record in the user resource table 124 may be handled as follows. If a node failed to get a new instance in NodeStartUpWorkflow, the node status may be set to Failed and the newly created instance and resource may be terminated. If no apps 118 are successfully running on the node after instance replacement, the node record may be deleted.

In configurations, when one or more app(s) 118 fail to move from instance 120 to instance 122 properly, all apps 118 as well as the instance 120 may be rolled back to a previous state. At the CompleteWorkFlowStage, PreviousState records may be swapped with CurrentState records. The previous state records may be stored in a different instance replacement state table and the current state records may be queried and inserted into the instance replacement state table with a modified sub-resource identifier, which may then be deletes from the user resource table 124. The previous state records may be queried from the instance replacement state table and inserted into the user resource table 124, which may then be deleted from the instance replacement state table.

In configurations, when one or more app(s) 118 fail to move instances properly, all apps 118 as well as the instance 120 may be terminated and a notification may be sent by the notification system 112 to the user 114 that their apps 118 are terminated. At CompleteWorkFlow stage, PreviousStateAppRecords and PreviousStateNodeRecords may be set to Deleting and the AppRecords (both in-service and failed apps) and node records in the user resource table 124 may be set to deleting.

By rollbacking to the old state, the user 114 may be able to continue to use the app(s) 118 without impact, but in the patching scenario, the apps 118 may continue to run on unpatched instances, e.g., instance 120. The approach of terminating instances/apps directly may be the opposite, that is, the unpatched instances may be removed, but the user 114 will have to re-create the apps on an instance.

Figure 2A:
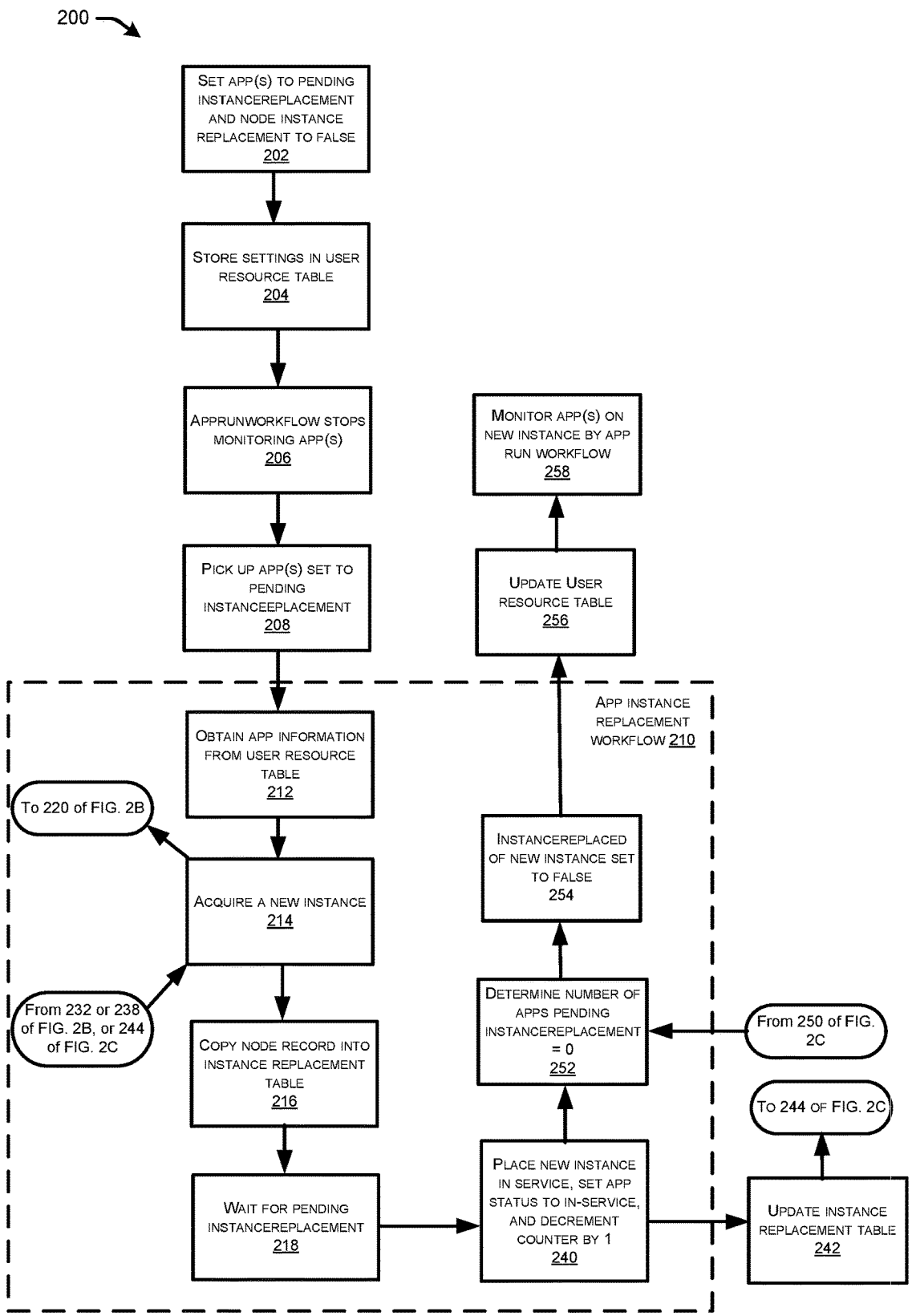
FIGS. 2A-2C schematically illustrate an example flow that the image replacement service of FIG. 1 may perform for moving apps from an image to a new image.
Figure 2B:
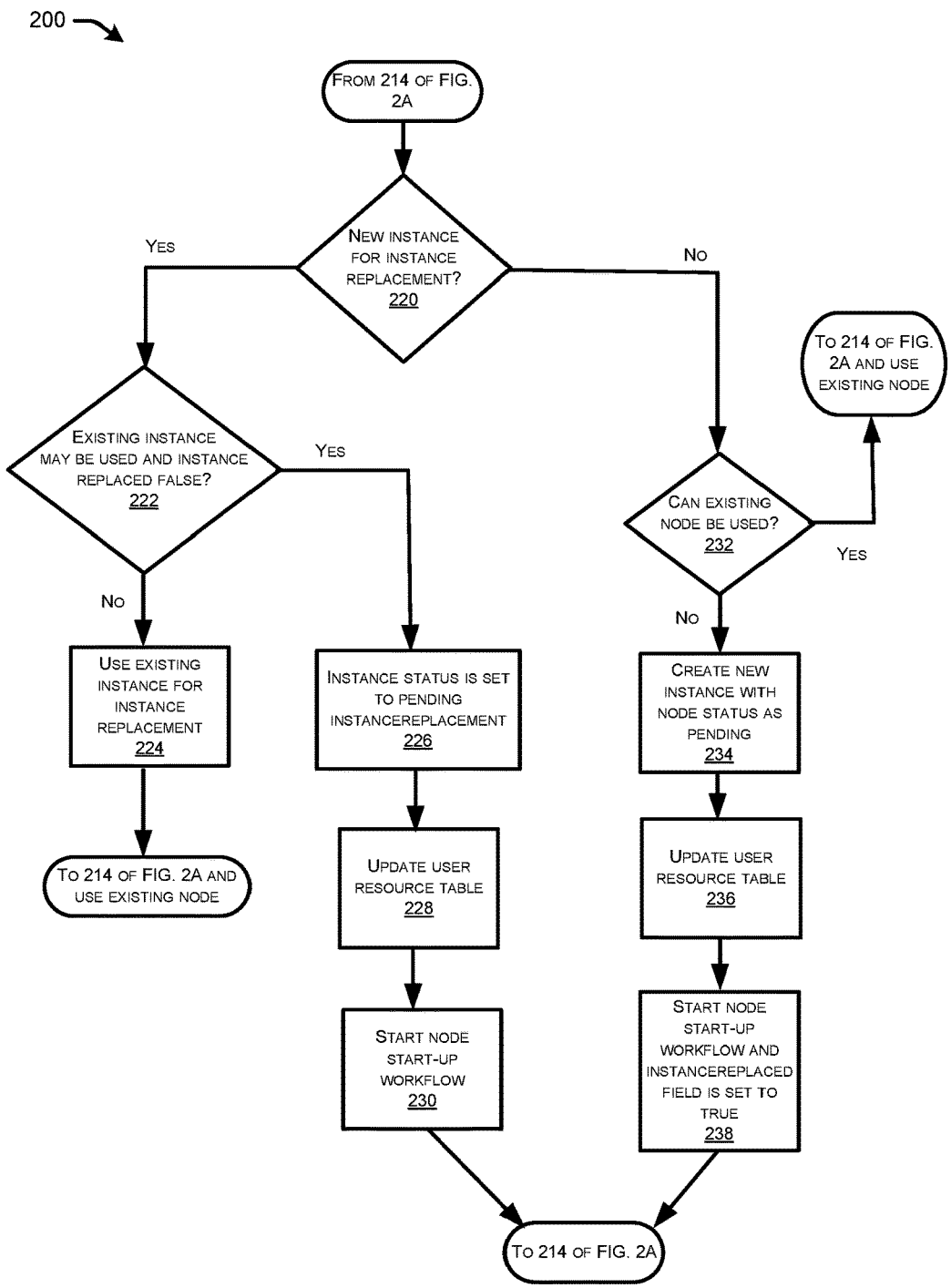
Figure 2C:
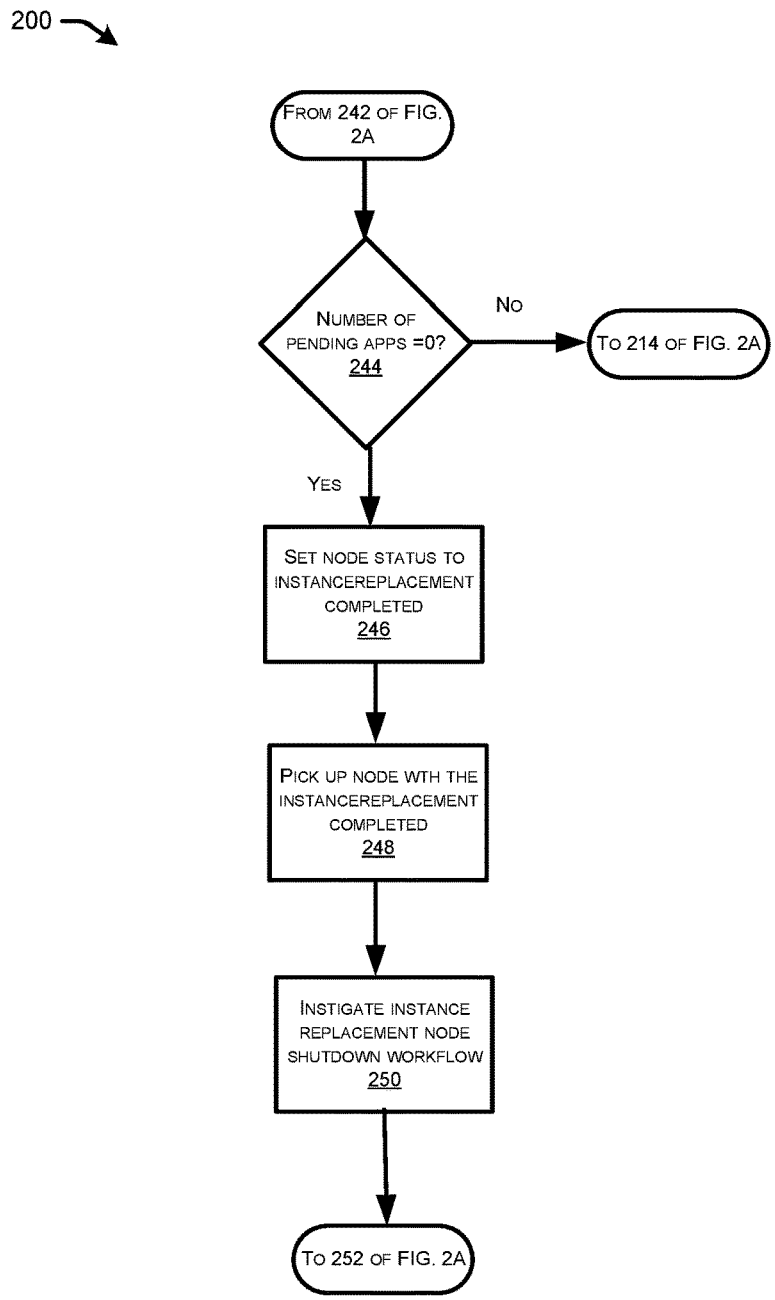

FIGS. 2A-2C schematically illustrate an example flow 200 for instance replacement in accordance with configurations described herein. At 202, a scheduler, e.g., scheduler 108, sets app(s), e.g., apps 118, to pending instance replacement and sets a node instance replacement to false for the app(s)' current instance, e.g., instance 120. At 204, the settings are stored in a user resource table, e.g., resource table 124. At 206, an app run workflow then stops monitoring of the app(s). At 208, a sweeper as part of an executor, e.g., executor 110, picks up the app(s) that are set to pending instance replacement. At 210, an app instance replacement workflow begins. At 212, app information, e.g., metadata, is obtained from a user resource table, e.g., user resource table 124, and copied to an instance replacement table, e.g., instance replacement table 126. The app instance workflow continues at 214 by acquiring a new instance. At 216, the node record is copied into the instance replacement table. At 218, the app instance replacement workflow then waits for the pending instance replacement instance, e.g., instance 122, to be in service.

Referring to FIG. 2B, from 214 in FIG. 2A, at 220 it is determined if acquiring the new instance is for instance replacement. At 222, for an existing instance, it is determined if the existing instance may be used and if the instance replaced is false. If the instance replaced is false and the instance is not in service, at 224 the existing instance may be used for app instance replacement. If the existing instance is in service and the instance replaced is false, at 226 the instance status is set to pending instance replacement and at 228 the user resource table is updated. At 230, a node start-up workflow begins. The flow 200 returns to 214 from 224 and 230.

If at 220 the acquiring the new instance is not for instance replacement, at 232 it is determined if an existing node can be used. If yes, then return to 214 and use the existing node. If no, then at 234 create a new instance with node status as pending. The flow 200 moves to 236 where the user resource table is updated. The sweeper of the executor then begins the node start-up workflow at 238 and a new node record with the instance replaced field set as true is provided to 214.

Referring back to FIG. 2A, at 240 the new instance is placed in service, e.g., the call complete at workflow phase is completed, the app status is set to in-service and a number of apps pending instance replacement is reduced by one. At 242, the instance replacement table is updated.

Referring to FIG. 2C, at 244 it is determined if the number of apps pending replacement equals zero. If no, return to 214 of FIG. 2A. If yes, at 246 the node status is set to instance replacement completed. At 248, the executor picks up the node with the instance replacement completed. At 250, the instance replacement node shut down workflow is instigated. Referring back to FIG. 2A, at 252 it is determined that the number of apps pending instance replacement equals zero and at 254, the instance replaced of the new instance is set to false. At 256 the user resource table is updated. At 258, the apps on the new instance are once again monitored by the app run workflow.

FIG. 3 illustrates an example flow diagram of example method 300 that illustrates aspects of the functions performed at least partly by the services as described in FIGS. 1, 2A, 2B, and 2C. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of the example method 300 for replacing instances in a service provider network and moving apps onto the new instances. At 302, a scheduler of an instance replacement service of a service provider network determines a first instance that needs replacement. For example, the scheduler 108 identifies that instance 120 needs to be replaced and schedules the apps 118 on the instance 120 for remapping, e.g., moving to instance 122. In configurations, the scheduler 108 may be in the form of a multi-channel manager (MCM) that is implemented using operation (ops) scripts. In some configurations, the scheduler 108 may be implemented to automatically identify which instances need to be replaced to address different user cases, e.g., instance replacement for patching of instances, updating specific versions of instances, etc.

More particularly, in configurations the scheduler 108 scans a list of instances (also referred to herein as nodes) in the computing service 104 and for a given set of predetermined criteria, e.g., high security risk needing security patching, the scheduler 108 selects instance identifiers (IDs) to be replaced. For each instance ID, the scheduler 108 obtains the list of apps, e.g., apps 118, running on the node, e.g., instance 120. The scheduler 108 sets a field (InstanceReplaced) for the instance 120 to false. InstanceReplaced is a field to indicate whether the instance 120 has been replaced in a given round of instance replacement. In configurations, conditional updates to set the status may be used to avoid potential race conditions (i.e., multiple calls to update the same database record around the same time). A node is an abstraction of an instance in a user resource table 124. Each node record in the user resource table 124 may only have one instance, and the node resource name is the identifier of a node. A node may have multiple apps collocated thereon.

At 304, the scheduler determines if a second instance exists. For example, for acquiring a new instance, the app/node records may be copied from the user resource table 124 to the instance replacement table 126 for tracking the apps' state before InstanceReplacement. There may be an existing instance, e.g., instance 122, available for an instance replacement request that is determined by a node/app key schema design. For example, if the existing instance 122 is in service and InstanceReplaced is false (i.e., the node's instance has not been replaced yet), the instance 122 may be set to PendingInstanceReplacement. This status may be updated through a database conditional write (conditional on the entire record) to avoid potential race conditions where multiple calls to update the same node record in the instance replacement table 126. If the conditional writes fail, a retry may be executed by refetching the records from the instance replacement table 126 as the new condition. In configurations, a maximum number of retries may be four, as the maximum number of app collocation on the same instance is four in configurations. In configurations, there may be more or fewer retries and/or app collocation on an instance. A NodeStartupWorkflow may be started to obtain a new instance, e.g., instance 122. In configurations, an app 118 may be placed on the existing instance directly, without modifying the node status. The AppInstanceReplacementWorkflow may wait for the PendingInstanceReplacement node to be in service and move on to next steps once the node is in service. At a complete app workflow phase of the AppInstanceReplacementWorkflow, the number of apps on the instance 120 being processed may be updated. If all apps 118 on the instance 120 have been handled, e.g., all apps 118 have been moved to instance 122, the instance 122 may be set to InstanceReplacementCompleted, and the executor 110 may begin a workflow to shut down resources before instance replacement.

At 306, based at least in part on determining the second instance exists, scheduling, by the scheduler, a first application to be moved from the first instance to the second instance. At 308, an executor of the instance replacement service moves the first application from the first instance to the second instance. For example, in configurations, the executor 110 moves the identified apps 118 to a different instance, e.g., instance 122. The executor 110 also handles errors that may occur, as well as resource management and clean-up. In configurations, the notification system 112 provides transparent communication with the user 114 on the process and actions.

At 310, the executor decrements a counter by one. At 312, based at least in part on a current value of the counter equaling zero, discontinuing, by the executor, moving of applications from the first instance to the second instance. For example, certain types of apps may be collocated on a single node. As a result, a completed instance replacement implies that all apps on the node have been replaced to the new node. Keeping track of the number of apps that are replaced onto the new node tracks the progress of the instance replacement. An instance replacement is completed when all apps on a node are replaced. In configurations, the progress through the PreviousStateNode may be tracked. In configurations, a field called NumberOfAppPendingInstanceReplacement may be used. Every time when the AppInstanceReplacement workflow succeeds, the PreviousStateRecord may be queried and reduced by 1 at the CompleteAppWorkflowPhase. Note, even if the apps are not successfully instance replaced, e.g., a failure occurs, this number may be reduced by 1.

At 314, the executor recycles the first instance. For example, when the number reaches zero, the node record in the InstanceReplacementTable is set InstanceReplacementCompleted, which triggers an InstanceReplacementNodeShutdownWorkflow to clean up and manage the instance resources. Additionally, the executor 110 "recycles" or shuts down the instance 120. The node record in the user resource table will set InstanceReplaced to False for the instance 122. As a result, the instance 122 is ready for a next-round of instance replacement in the future. With such a configuration, there is no need to maintain an additional record in the user resource table and the PreviousState records in InstanceReplacementStateTable share the same key schema as those in user resource table. Thus, the existing query and modification logic may be shared across two tables.

Accordingly, the techniques and architecture described herein provide for replacing images in a computing service of a service provider network and moving apps from an instance to a new instance. The apps can be moved automatically with minimal effect on user experience. Additionally, by moving apps automatically before an instance is compromised due to security issues, computing and storage resources of the service provider network are not used as long, freeing up computing resources for processing of other data and/or other projects and/or services within the service provider network. Additionally, by moving apps automatically before an instance is compromised due to security issues stealing of resources, confidential information, etc., may be prevented.

Figure 4:
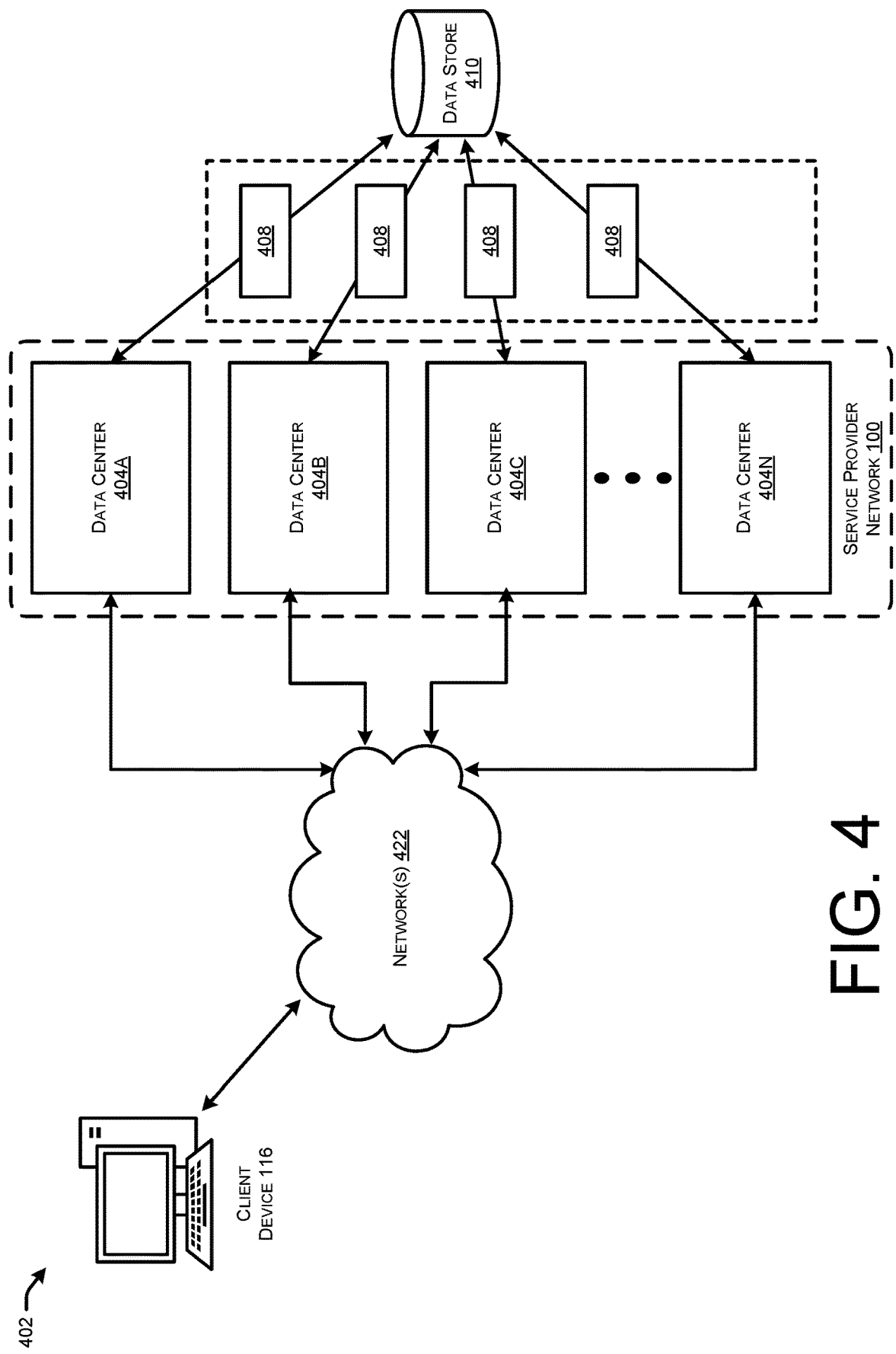
FIG. 4 is a system and network diagram that shows an illustrative operating environment that includes a service provider network that can be configured to implement aspects of the functionality described herein.

FIG. 4 is a system and network diagram that shows one illustrative operating environment 400 for the configurations disclosed herein that includes a service provider network 100 that can be configured to perform the techniques disclosed herein and which may be accessed by a computing device 402. The service provider network 100 can provide computing resources, like virtual machine (VM) or instances (VM instances herein) and storage, on a permanent or an as-needed basis. Among other types of functionality, the computing resources provided by the service provider network 100 may be utilized to implement the various services described above such as, for example, the image replacement service 106.

Each type of computing resource provided by the service provider network 100 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

The computing resources provided by the service provider network 100 may be enabled in one embodiment by one or more data centers 404A-404N (which might be referred to herein singularly as "a data center 404" or in the plural as "the data centers 404"). The data centers 404 are facilities utilized to house and operate computer systems and associated components. The data centers 404 typically include redundant and backup power, communications, cooling, and security systems. The data centers 404 can also be located in geographically disparate locations. One illustrative embodiment for a data center 404 that can be utilized to implement the technologies disclosed herein will be described below with regard to FIG. 4.

The data centers 404 may be configured in different arrangements depending on the service provider network 100. For example, one or more data centers 404 may be included in or otherwise make-up an availability zone. Further, one or more availability zones may make-up or be included in a region. Thus, the service provider network 100 may comprise one or more availability zones, one or more regions, and so forth. The regions may be based on geographic areas, such as being located within a predetermined geographic perimeter.

Users of the service provider network 100 may access the computing resources provided by the service provider network 100 over any wired and/or wireless network(s) 422, which can be a wide area communication network ("WAN"), such as the Internet, an intranet or an Internet service provider ("ISP") network or a combination of such networks. For example, and without limitation, a computing device, e.g., computing device 402, operated by a user of the service provider network 100 may be utilized to access the service provider network 100 by way of the network(s) 422. It should be appreciated that a local-area network ("LAN"), the Internet, or any other networking topology known in the art that connects the data centers 404 to remote customers and other users can be utilized. It should also be appreciated that combinations of such networks can also be utilized.

Each of the data centers 404 may include computing devices that include software, such as applications that receive and transmit data 408. For instance, the computing devices included in the data centers 404 may include software components which transmit, retrieve, receive, or otherwise provide or obtain the data 408 from a data store 410. For example, the data centers 404 may include or store the data store 410, which may include the data 408.

Figure 5:
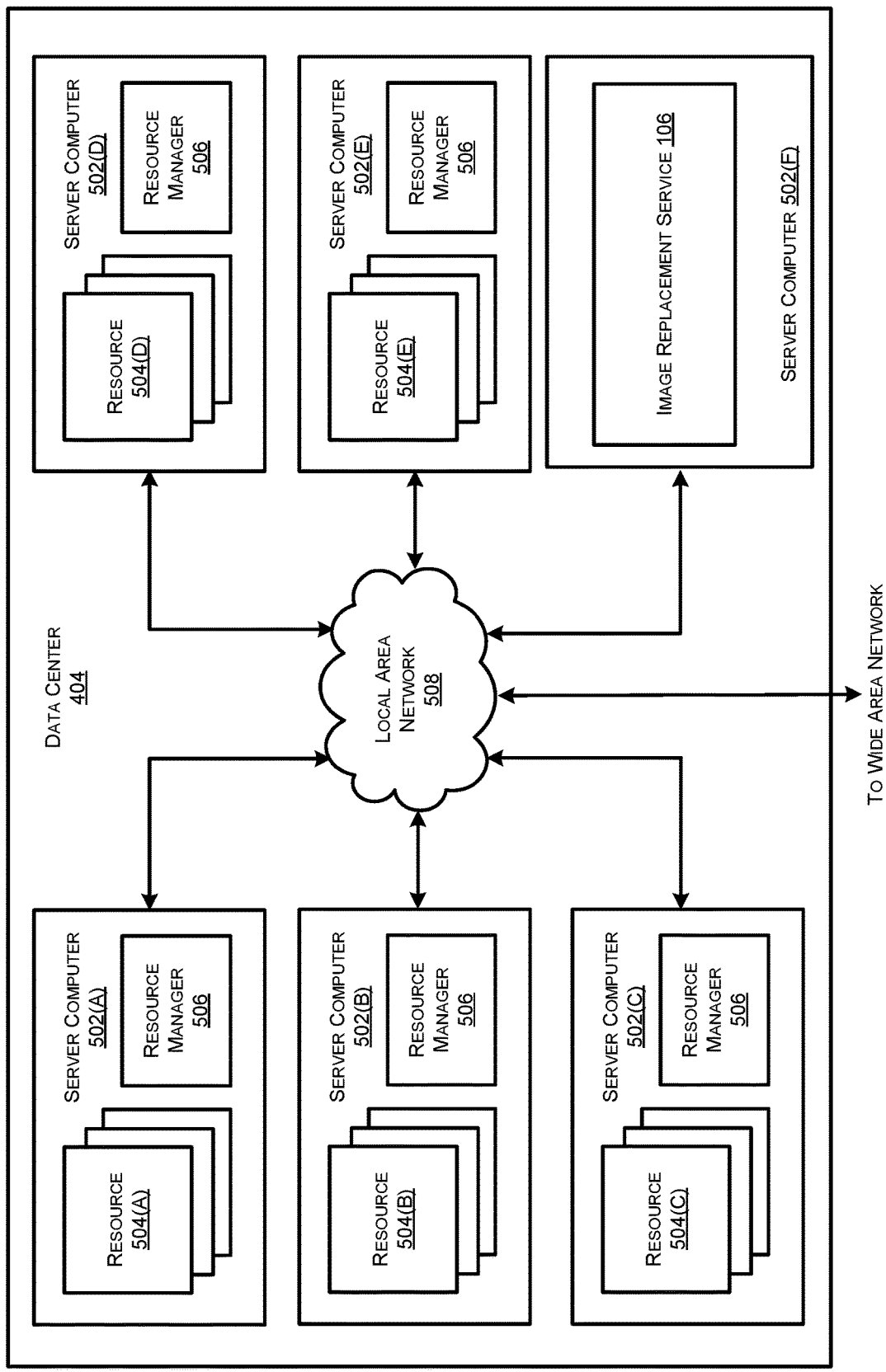
FIG. 5 is a computing system diagram illustrating a configuration for a data center that can be utilized to implement aspects of the technologies disclosed herein.

FIG. 5 is a computing system diagram that illustrates one configuration for a data center 404 that implements aspects of the technologies disclosed herein. The example data center 404 shown in FIG. 5 includes several server computers 502A-502F (which might be referred to herein singularly as "a server computer 502" or in the plural as "the server computers 502") for providing computing resources 504A-504E.

The server computers 502 can be standard tower, rack-mount, or blade server computers configured appropriately for providing the computing resources described herein (illustrated in FIG. 5 as the computing resources 504A-504E). As mentioned above, the computing resources provided by the service provider network 100 can be data processing resources such as VM instances or hardware computing systems, database clusters, computing clusters, storage clusters, data storage resources, database resources, networking resources, and others. Some of the server computers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single server computer 502. Server computers 502 in the data center 404 can also be configured to provide network services and other types of services, some of which are described in detail below with regard to FIG. 6.

The data center 404 shown in FIG. 5 also includes a server computer 502F that can execute some or all of the software components described above. For example, and without limitation, the server computer 502F can be configured to execute components of the service provider network 100, including the instance replacement service 106, and/or the other software components described above. The server computer 502F can also be configured to execute other components and/or to store data for providing some or all of the functionality described herein. In this regard, it should be appreciated that the services illustrated in FIG. 5 as executing on the server computer 502F can execute on many other physical or virtual servers in the data centers 404 in various embodiments.

In the example data center 404 shown in FIG. 5, an appropriate LAN 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 404A-404N, between each of the server computers 502A-502F in each data center 404, and, potentially, between computing resources in each of the server computers 502. It should be appreciated that the configuration of the data center 404 described with reference to FIG. 5 is merely illustrative and that other implementations can be utilized.

Figure 6:
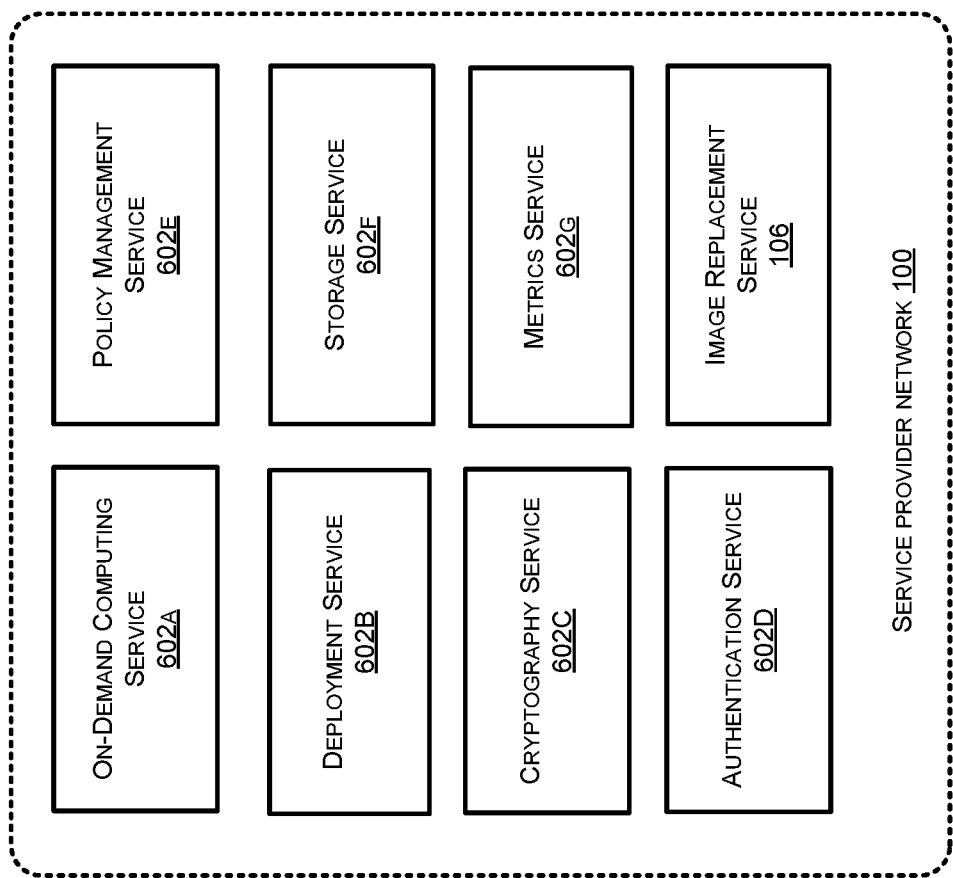
FIG. 6 is a network services diagram that shows aspects of several services that can be provided by and utilized within a system, or a larger system of which the system is a part, which is configured to implement the various technologies disclosed herein.

FIG. 6 is a system and network diagram that shows aspects of several network services that can be provided by and utilized within a service provider network 100 in one embodiment disclosed herein. In particular, and as discussed above, the service provider network 100 can provide a variety of network services to users within the service provider network 100, as well as customers, including, but not limited to, the instance service 106. The service provider network 100 can also provide other types of services including, but not limited to, an on-demand computing service 602A (e.g., computing services 104), a deployment service 602B, a cryptography service 602C, a storage service 602D (e.g., storage services 102), an authentication service 602E, and/or a policy management service 602G, some of which are described in greater detail below. Additionally, the service provider network 100 can also provide other services, some of which are also described in greater detail below.

It should be appreciated that customers of the service provider network 100 can include organizations or individuals that utilize some or all of the services provided by the service provider network 100. As described herein, a customer or other user can communicate with the service provider network 100 through a network, such as the network 422 shown in FIG. 4. Communications from a user computing device, such as the client device 116 shown in FIG. 1, to the service provider network 100 can cause the services provided by the service provider network 100 to operate in accordance with the described configurations or variations thereof.

It is noted that not all embodiments described include the services described with reference to FIG. 6 and that additional services can be provided in addition to or as an alternative to services explicitly described. Each of the services shown in FIG. 6 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 602A to store data in or retrieve data from a storage service). Additional details regarding some of the services shown in FIG. 6 will now be provided.

As discussed above, the on-demand computing service 602A (can be a collection of computing resources configured to instantiate VM instances and to provide other types of computing resources on demand. For example, a customer or other user of the service provider network 100 can interact with the on-demand computing service 602A (via appropriately configured and authenticated network services API calls) to provision and operate VM instances that are instantiated on physical computing devices hosted and operated by the service provider network 100.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 602A is shown in FIG. 6, any other computer system or computer system service can be utilized in the service provider network 100, such as a computer system or computer system service that does not employ virtualization and instead provisions computing resources on dedicated or shared computers/servers and/or other physical devices.

The service provider network 100 can also include a cryptography service 602C. The cryptography service 602C can utilize storage service 602F of the service provider network 100 to store encryption keys in encrypted form, whereby the keys are usable to decrypt customer keys accessible only to particular devices of the cryptography service 602C. The cryptography service 602C can also provide other types of functionality not specifically mentioned herein.

As illustrated in FIG. 6, the service provider network 100, in various embodiments, also includes an authentication service 602D and a policy management service 602E. The authentication service 602D, in one example, is a computer system (i.e., collection of computing resources) configured to perform operations involved in authentication of users. For instance, one of the services 602 shown in FIG. 6 can provide information from a user to the authentication service 602D to receive information in return that indicates whether or not the requests submitted by the user are authentic.

The policy management service 602E, in one example, is a network service configured to manage policies on behalf of customers or internal users of the service provider network 100. The policy management service 602E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 100 can additionally maintain other services 602 based, at least in part, on the needs of its customers. For instance, the service provider network 100 can maintain a deployment service 602B for deploying program code and/or a data warehouse service in some embodiments. Other services can include object-level archival data storage services, database services, and services that manage, monitor, interact with, or support other services. The service provider network 100 can also be configured with other services not specifically mentioned herein in other embodiments.

Figure 7:
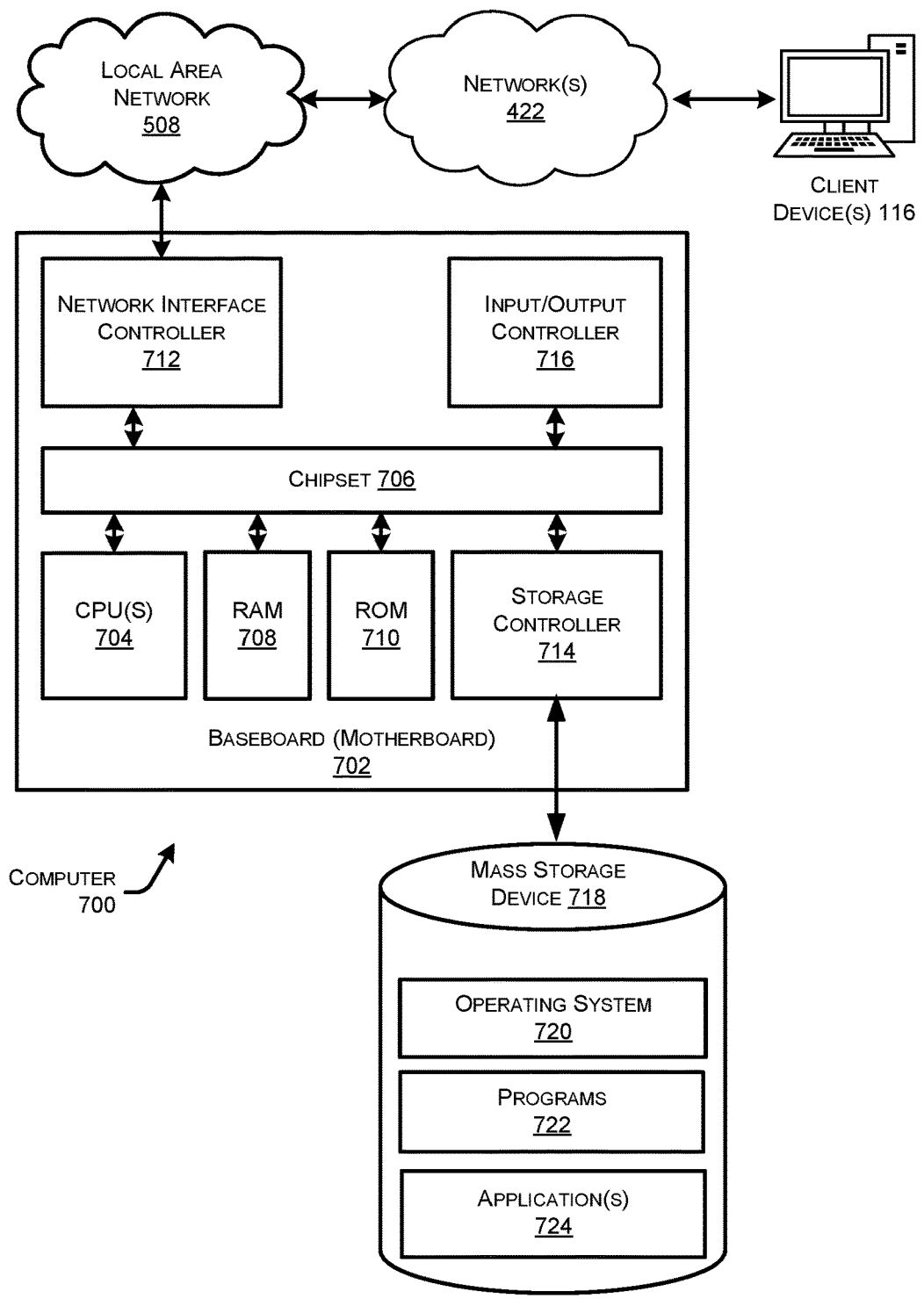
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices 502 and computer systems through a network, such as the network 726. The chipset 706 can include functionality for providing network connectivity through a Network Interface Controller (NIC) 712, such as a gigabit Ethernet adapter. The NIC 712 is capable of connecting the computer 700 to other computing devices 502 over the network 726 (or 422). It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722 (e.g., agents, etc.), data, and/or applications(s) 724, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the service provider network 100, and or any components included therein, may be supported by one or more devices similar to computer 700. Stated otherwise, some or all of the operations performed by the service provider network 100, and or any components included therein, may be performed by one or more computers 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 718 can store other system or application programs and data utilized by the computer 700.

In one embodiment, the mass storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-7. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

The computer 700 may transmit, receive, retrieve, or otherwise provide and/or obtain data and/or results to and/or from the service provider network 100. The computer 700 may store the data on the operating system 720, and/or the programs 722 that are stored in the mass storage device 718 to update or otherwise modify the operating system 720 and/or the programs 722.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
   determining, by a scheduler of an instance replacement service of a service provider network, a first instance that needs replacement, wherein the first instance requires patching with respect to security issues;
   determining, by the scheduler, one or more applications on the instance that need to be moved to a second instance;
   scheduling, by the scheduler, the one or more applications to be moved from the first instance to the second instance, wherein the scheduling comprises starting a workflow of moving the one or more applications;
   determining, by an executor of the instance replacement service, if the second instance exists;
   based on determining that the second instance does not exist, creating, by the executor, the second instance;
   moving, by the executor, a first application of the one or more applications from the first instance to the second instance;
   decrementing, by the executor, a counter by one, wherein a starting value of the counter is equal to a number of applications that need to be moved from the first instance to the second instance;
   based on determining that the second instance does exist, moving, by the executor, the first application of the one or more applications from the first instance to the second instance;
   decrementing, by the executor, the counter by one;
   determining, by the executor, a current value of the counter;
   based on the current value equaling zero, discontinuing, by the executor, the workflow; and
   recycling, by the executor, the first instance.

2. The method of claim 1, further comprising:
   obtaining, by the executor, metadata relating to a state of the one or more applications from a user resource table;
   storing, by the executor, the metadata in an instance replacement table; and
   subsequent to moving the first application, auditing, by the executor, the metadata, wherein the auditing comprises determining how many times an application has been moved among instances, debugging errors related to moving the one or more applications from the first instance to the second instance, and releasing resources of the service provider network after moving the one or more applications from the first instance to the second instance, wherein the resources are related to the states of the one or more applications.

3. The method of claim 1, further comprising:
determining, by the executor, one or more configurations of the first application are incompatible with the second instance;
providing, by the executor, a notification to a user of the first application that one or more configurations of the first application are incompatible with the second instance;
receiving, by a service of the service provider network from the user, an indication of deletion of the first application from the second instance;
receiving, by the service from the user, an indication of recreation of the first application as a recreated first application; and
placing, by the service, the recreated first application on the second instance.

4. The method of claim 1, further comprising:
determining, by the executor, the moving of the first application from the first instance to the second instance has failed;
deleting, by the executor, metadata related to the first application from an instance replacement table;
providing, by the executor, a notification to a user of the first application that the moving of the first application from the first instance to the second instance has failed;
receiving, by a service of the service provider network from the user, an indication of recreation of the first application as a recreated first application; and
placing, by the service, the recreated first application on the second instance.

5. The method of claim 1, further comprising:
receiving, by a service of the service provider network from a user, an indication of creation of a second application;
determining, by a service of the service provider network, the workflow is in progress;
waiting, by the service, for the workflow to be discontinued; and
after discontinuing the workflow, placing, by the service, the second application on the second instance.

6. A method comprising:
determining, by a scheduler of an instance replacement service of a service provider network, a first instance that needs replacement;
determining, by the scheduler, if a second instance exists;
based at least in part on determining the second instance exists, scheduling, by the scheduler, a first application to be moved from the first instance to the second instance;
moving, by an executor of the instance replacement service, the first application from the first instance to the second instance;
decrementing, by the executor, a counter by one;
based at least in part on a current value of the counter equaling zero, discontinuing, by the executor, moving of applications from the first instance to the second instance; and
recycling, by the executor, the first instance.

7. The method of claim 6, further comprising:
based upon determining non-existence of the second instance, creating, by the executor, the second instance.

8. The method of claim 6, further comprising:
determining, by the scheduler, multiple applications that need to be moved from the first instance to the second instance, wherein the multiple applications comprise the first application;
scheduling, by the scheduler, the multiple applications to be moved from the first instance to the second instance; and
setting, by the executor, the counter to a value equal to a number of the multiple applications to be moved from the first instance to the second instance.

9. The method of claim 8, further comprising:
receiving, by a service of the service provider network from a user, an indication of deletion of a second application of the multiple applications; and
pausing, by the service, deletion of the second application until the second application has been moved from the first instance to the second instance.

10. The method of claim 6, further comprising:
obtaining, by the executor, metadata relating to a state of the first application from a user resource table;
storing, by the executor, the metadata in an instance replacement table; and
subsequent to moving the first application, auditing, by the executor, the metadata, wherein the auditing comprises determining how many times the first application has been moved among instances, debugging errors, and releasing resources of the service provider network after moving the first application from the first instance to the second instance, wherein the resources are related to the state of the first application.

11. The method of claim 6, further comprising:
determining, by the executor, one or more configurations of the first application are incompatible with the second instance;
providing, by the executor, a notification to a user of the first application that one or more configurations of the first application are incompatible with the second instance;
receiving, by a service of the service provider network from the user, an indication of deletion of the first application from the second instance;
receiving, by the service from the user, an indication of recreation of the first application as a recreated first application; and
placing, by the service, the recreated first application on the second instance.

12. The method of claim 6, further comprising:
determining, by the executor, the moving of the first application from the first instance to the second instance has failed;
deleting, by the executor, metadata related to the first application from an instance replacement table;
providing, by the executor, a notification to a user of the first application that the moving of the first application from the first instance to the second instance has failed;
receiving, by a service of the service provider network from the user, an indication of recreation of the first application as a recreated first application; and
placing, by the service, the recreated first application on the second instance.

13. The method of claim 6, further comprising:
based on the moving of the first application from the first instance to the second instance, decrementing, by the executor, a counter by one.

14. The method of claim 6, further comprising:
receiving, by a service of the service provider network from a user, an indication of creation of a second application;
determining, by the service of the service provider network, the moving of applications from the first instance to the second instance is in progress;
waiting, by the service, for discontinuing of the moving of applications from the first instance to the second instance; and
after discontinuing of the moving of applications from the first instance to the second instance, placing, by the service, the second application on the second instance.

15. One or more computer-readable storage media storing computer-executable instructions that, when executed, cause one or more processors to perform operations comprising:
determining, by a scheduler of an instance replacement service of a service provider network, a first instance that needs replacement;
determining, by the scheduler, if a second instance exists;
based upon determining the second instance exists, scheduling, by the scheduler, a first application to be moved from the first instance to the second instance;
moving, by an executor of the instance replacement service, the first application from the first instance to the second instance;
decrementing, by the executor, a counter by one;
based on a current value of the counter equaling zero, discontinuing, by the executor, moving of applications from the first instance to the second instance; and
recycling, by the executor, the first instance.

16. The one or more computer-readable storage media of claim 15, wherein the operations further comprise:
based upon determining non-existence of the second instance, creating, by the executor, the second instance.

17. The one or more computer-readable storage media of claim 15, wherein the operations further comprise:
determining, by the scheduler, multiple applications that need to be moved from the first instance to the second instance, wherein the multiple applications comprise the first application;
scheduling, by the scheduler, the multiple applications to be moved from the first instance to the second instance; and
setting, by the executor, the counter to a value equal to a number of the multiple applications to be moved from the first instance to the second instance.

18. The one or more computer-readable storage media of claim 17, wherein the operations further comprise:
receiving, by a service of the service provider network from a user, an indication of deletion of a second application of the multiple applications; and
pausing, by the service, deletion of the second application until the second application has been moved from the first instance to the second instance.

19. The one or more computer-readable storage media of claim 15, wherein the operations further comprise:
obtaining, by the executor, metadata relating to a state of the first application from a user resource table;
storing, by the executor, the metadata in an instance replacement table; and
subsequent to moving the first application, auditing, by the executor, the metadata, wherein the auditing comprises determining how many times the first application has been moved among instances, debugging errors, and releasing resources of the service provider network after moving the first application from the first instance to the second instance, wherein the resources are related to the state of the first application.

20. The one or more computer-readable storage media of claim 15, wherein the operations further comprise:
determining, by the executor, one or more configurations of the first application are incompatible with the second instance;
providing, by the executor, a notification to a user of the first application that one or more configurations of the first application are incompatible with the second instance;
receiving, by a service of the service provider network from the user, an indication of deletion of the first application from the second instance;
receiving, by the service from the user, an indication of recreation of the first application as a recreated first application; and
placing, by the service, the recreated first application on the second instance.

* * * * *